March 4, 1930. E. KRIEGE 1,749,432
NURSING BOTTLE
Filed June 6, 1927
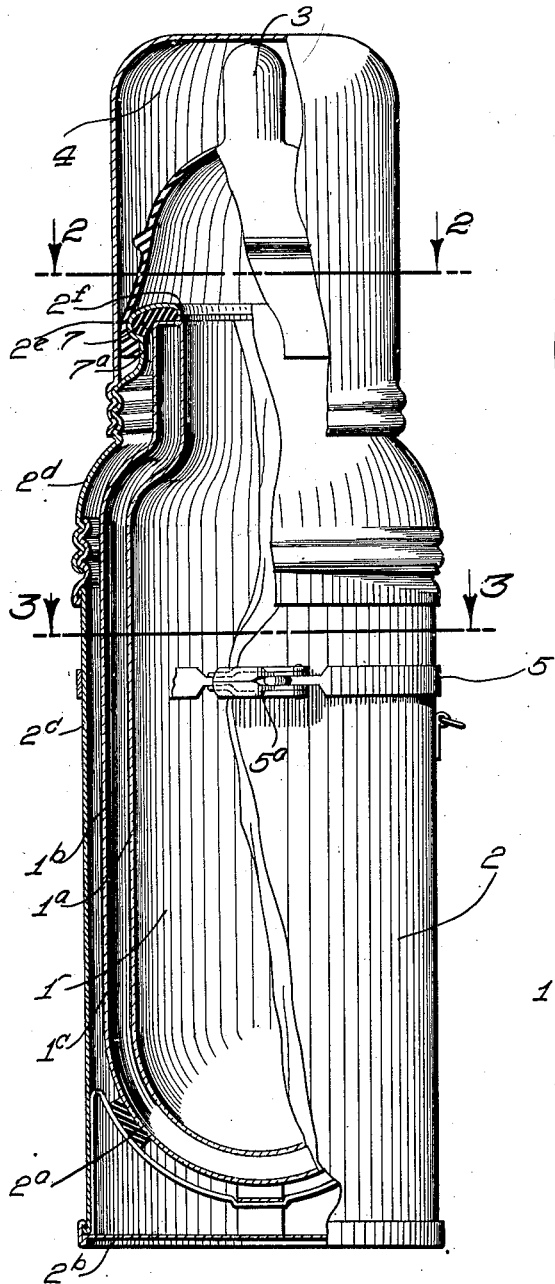
FIG. 1
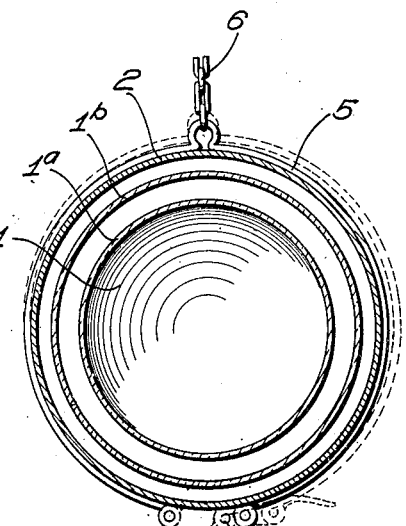
FIG. 2
FIG. 3
INVENTOR.
ELIZABETH KRIEGE
BY A. B. Bowman
ATTORNEY Patented Mar. 4, 1930

1,749,432

UNITED STATES PATENT OFFICE

ELIZABETH KRIEGE, OF SAN DIEGO, CALIFORNIA

NURSING BOTTLE

Application filed June 6, 1927. Serial No. 196,786.

My invention relates to thermos nursing bottles and in particular to a bottle of this type having a wide mouth fitted with a conventional large bell-shaped nipple, and the objects of my invention are: first, to provide a bottle of this class in which the initial temperature of the fluid contained therein will remain constant over a long period of time; second, to provide a bottle of this class which is adapted to the use of conventional large end nipples; third, to provide a bottle of this class which is not easily broken through rough handling; fourth, to provide a bottle of this class which is easy to clean and sterilize and is sanitary; fifth, to provide a bottle of this class which may be used as an ordinary thermos flask for any food when not required as a nursing bottle; and sixth, to provide a bottle of this class which may be attached to a child's bed or other object, preventing it from being thrown on the floor or otherwise and broken.

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, which form a part of this application, in which:

Figure 1 is an elevational view of my bottle, shown partly in section; Fig. 2 is a cross-sectional view along the line 2—2 of Fig. 1; and Fig. 3 is a further cross-sectional view taken along the line 3—3 of Fig. 1.

Like characters of reference refer to similar parts and portions throughout the several views of the drawings.

The principal parts of my invention are the vacuum bottle 1, casing 2, nipple 3, cap 4, safety strap 5, and chain 6.

The vacuum bottle 1, comprising an inner receptacle 1$^a$, outer wall 1$^b$ and intermediate vacuum chamber 1$^c$, is supported in spaced relation within the casing 2 at its lower portion by suitable resilient pads 2$^a$ resting on straps 2$^b$, secured in any desirable manner to the inner walls of the casing 2. The latter is formed preferably of a lower cylindrical portion 2$^c$ and an upper, funneled portion 2$^d$, which is preferably screwed securely to the latter after the receptacle 1 has been placed in position. The upper edge of the casing portion 2$^d$ is spun initially outwardly, forming a lip portion 2$^e$, then inwardly and flanged downwardly as at 2$^f$ in Fig. 1, and is held in spaced relation with the receptacle 1 by a thick rubber ring cushion 7, said cushion having preferably an enlarged, beaded portion 7$^a$, which is adapted to be wedged between the neck of the receptacle and the outer casing. The nipple 3 is stretched over the lip 2$^e$ of the casing portion 2$^d$ and detachably held thereby. A cap 4 is screwed to the casing portion 2$^d$ in the conventional manner, thus sealing the bottle and protecting the nipple when the bottle is not in use.

In order to prevent the bottle from being thrown and broken by an infant, I provide a safety strap 5, held securely in place around the bottle by means of a suitable clamp 5$^a$ and provided with a chain 6 or other suitable attachment, which may be secured to the bed, chair or other place occupied by the infant when the bottle is in use.

It is obvious that the receptacle may serve as a container for any other food when not required as a nursing bottle, the nipple being replaced by a cork.

In the form embodied by my invention, the receptacle may be readily removed for the purpose of cleaning and filling. I prefer a transparent receptacle with suitable graduations thereon. As shown in Fig. 1, the rim of the receptacle is protected by the overhanging annular rim portion of the casing member 2$^d$. The latter is made preferably of a non-corroding material and, as it is easily removed, all parts exposed to the contents of the receptacle may be separately sterilized.

Though I have shown and described a particular construction, combination and arrangement of parts and portions, I do not wish to be limited to this particular construction, combination and arrangment, but desire to include in the scope of my invention, the construction, combination and arrangement substantially as set forth in the appended claims.

Having thus described my invention, what I claim as new and desire to secure by Letters Patent is:

1. In a nursing bottle, a wide-mouthed vacuum wall receptacle, an outer casing spaced therefrom with a wide mouth, resilient means for holding said receptacle in spaced relation with said outer casing, and a bell-shaped nipple secured over the mouth ends of said casing and said receptacle.

2. In a nursing bottle, a wide-mouthed vacuum wall receptacle, an outer casing spaced therefrom provided with a wide mouth, said outer casing having an annular rim portion at its open end overlapping the top of the neck of said receptacle, a resilient ring-shaped spacing member between the top of the neck of the receptacle and said annular rim portion, and a bell-shaped nipple expanded over said annular rim portion and enveloping the mouth ends of said casing and receptacle.

3. In a nursing bottle, a vacuum wall receptacle, a lower casing portion resiliently supporting said receptacle, an upper casing portion screwably secured to said lower casing portion and having an annular beaded rim adapted to envelop the upper neck portion of said receptacle, a bell-shaped nipple secured over said rim and enveloping the upper neck portions of said casing and receptacle, and a resilient beaded cushion supported within said annular rim and between said rim and the upper neck portion of said receptacle.

4. In a nursing bottle, a wide mouthed vacuum wall receptacle, an outer casing having a removable annular rim portion extending over the neck of said receptacle and forming an outwardly projecting lip portion, a rubber washer positioned within said rim portion and forming a fluid tight joint with the neck and rim portion, and a bell shaped nipple expanded over said lip portion and enveloping the mouthed ends of said casing and receptacle.

In testimony whereof I have hereunto set my hand at San Diego, California, this 26th day of May, 1927.

ELIZABETH KRIEGE.